June 23, 1942. N. E. TOUSLEY 2,287,282
METHOD OF MAKING FLAT ARTICLES HAVING GROOVED SURFACES
Filed March 9, 1939
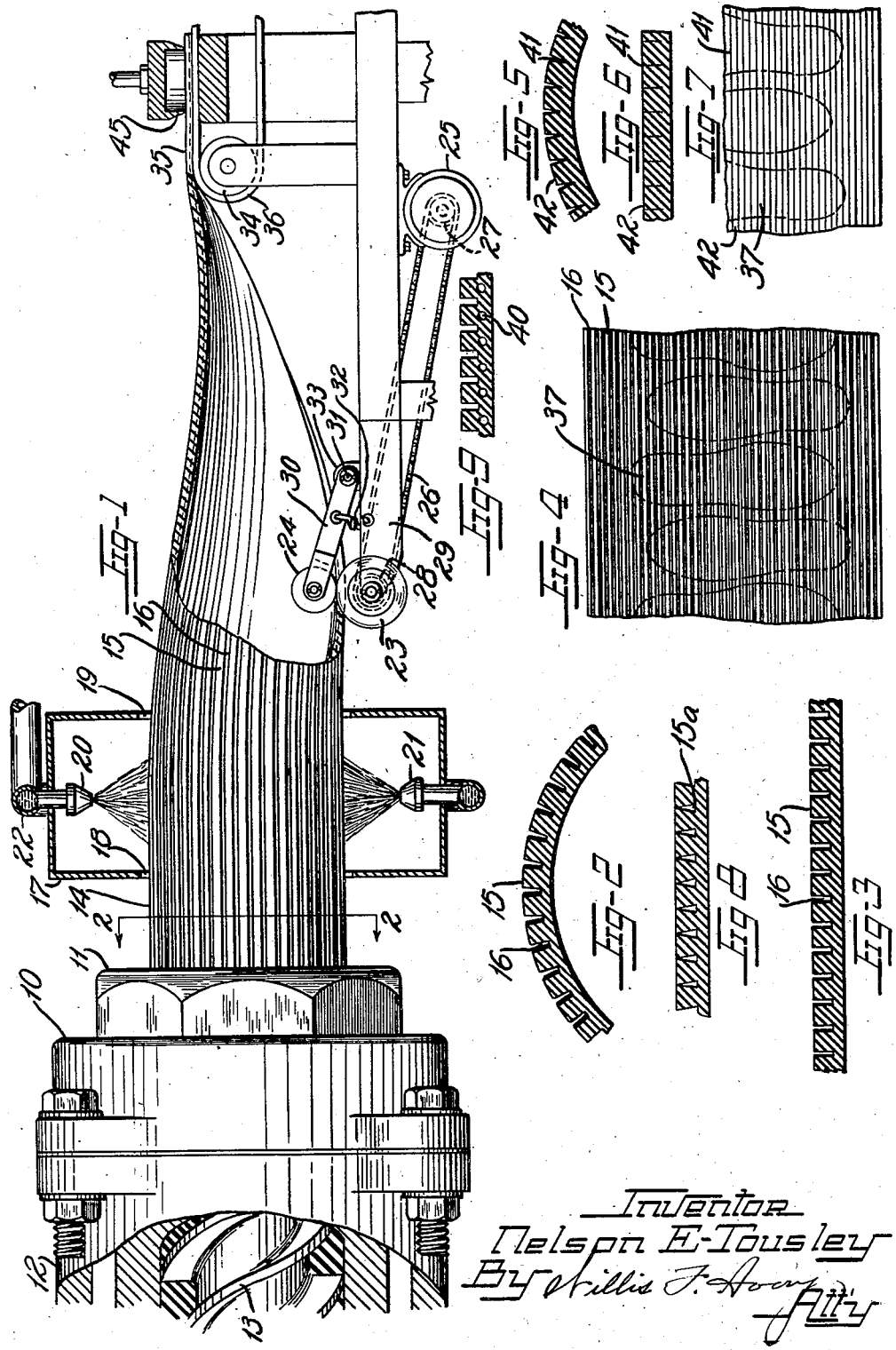
Inventor
Nelson E. Tousley Patented June 23, 1942

2,287,282

UNITED STATES PATENT OFFICE 2,287,282

METHOD OF MAKING FLAT ARTICLES HAVING GROOVED SURFACES

Nelson E. Tousley, Waban, Mass., assignor to The B. F. Goodrich Company, New York, N. Y., a corporation of New York Application March 9, 1939, Serial No. 260,752

5 Claims. (Cl. 18—47.5)

This invention relates to the manufacture of substantially flat articles having grooved surfaces, and the invention is especially useful in the manufacture of rubber shoe soles having ribs and grooves for skid resistance.

It is highly desirable that shoe soles especially for use on athletic shoes have sufficient body to resist injury to the feet and at the same time sufficient traction and flexibility. The present invention aims to eliminate expensive cutting and molding operations in the manufacture of rubber soles and other substantially flat articles grooved on one face.

The principal objects of the invention are to simplify procedure, to avoid the necessity for cutting, to provide for production by extrusion, to eliminate undesirable adhesions, and generally to provide economy and efficiency of procedure.

These and other objects will appear from the following description and the accompanying drawing:

Of the drawing:

Fig. 1 is an elevation, partly broken away and partly in section, showing the apparatus used in the preferred form of practicing the invention.

Fig. 2 is a sectional view of the extruded sheet as it issues from the extruder, taken on line 2—2 of Fig. 1.

Fig. 3 is a similar view of a portion of the sheet flattened.

Fig. 4 is a plan view of the flattened sheet with shoe soles severed therefrom.

Fig. 5 is a view similar to Fig. 2 showing a modified form of sheet.

Fig. 6 shows the sheet of Fig. 5 flattened.

Fig. 7 is a view similar to Fig. 4 showing the cutting step.

Fig. 8 is a view similar to Figs. 3 and 6 showing a flattened sheet having undercut ribs.

Fig. 9 is a similar view of a modification showing tubular apertures for increasing the cushioning of the sheet.

Referring to the drawing, the numeral 10 indicates an extruding head having a die 11 and attached to a cylinder 12 in which a forcing screw 13 operates to force a plastic material such as unvulcanized rubber composition through the die. The die is of such a shape as to form a tube 14 of composition having on its outer wall wide parallel ribs 15 separated by narrow deep grooves 16.

By forming the sheet in tubular form, the ribs 15 are more widely spaced from each other than in the flattened sheet, thereby permitting accurate forming of their flanking faces and preventing undesired contact of such faces with each other such as would cause adhesion. This construction permits the formation of undercut grooves in the finished article, as shown in Fig. 8. The ribs may be undercut as shown in Fig. 8 at 15a where the ribs are substantially in contact at the face of the sheet in the flattened sheet but are separated in the curved sheet. The sheet may also be formed with longitudinal ducts 40 or apertures during the extrusion thereof, to provide additional resilience or cushioning properties.

As the material in the form of the tube 14 leaves the die 11 it is preferably coated on its grooved face with a material adapted to prevent adhesion of the walls adjacent the grooves. This may be accomplished by dusting the tube with soapstone dust or other dust adapted to prevent adhesion, or the tube may be sprayed with a lacquer adapted to form a nonadhesive coating thereon or with a dispersion of powdered materials or other adhesion preventing fluid. For example, the tubing may proceed through a compartment 17 through openings 18, 19 and one or more spray nozzles 20, 21 within the compartment supplied by a pipe 22 may be used to spray the adhesion preventitive on the tube. By a circle of spray heads, the tube may be sprayed from all directions radially thereof to insure application to all the walls of the grooves.

After an interval of travel to permit drying of the coating, the tube 14 is slit longitudinally, as by a circular rotatable cutting disc 23 acting from without, and a cooperating pressure roller 24 acting from within the tube, the cutter 23 being driven, as by a motor 25 through a chain 26 and sprockets 27, 28, and the cutter 23 being rotatably mounted on an arm 29. Arm 30 is pivoted, as at 31, to a support 33, and projects through the cut made in the tube. A coil spring 32 having one end attached to arm 29 and the other attached to arm 30 provides the necessary pressure.

The split tube is flattened by passing it over a roller 34, its own weight being sufficient to flatten it to form a sheet 35. A belt 36 may be passed about the roller to support the sheet. Flattening of the sheet circumferentially causes the ribs 15 to approach more closely to each other when their groove defining walls may, where the grooves are extremely narrow, as in Fig. 5, actually touch each other although adhesion thereof is prevented by the separating film of adhesion preventing material.

After the sheet is flattened a cutting or dinking die 45 may be used to cut shoe soles 37 or other substantially flat articles therefrom, the die being arranged determinately with respect to the ribs on the sheet. In the case of shoe soles, the soles are cut as indicated with the ribs and grooves extending crosswise thereof.

In the material illustrated in Figs. 5 to 7 the grooves 41 are V-shaped and extremely narrow so that the resulting flattened material presents a substantially continuous or solid face 42 incised by deep grooves 41 of knife-cut proportions, it being feasible to bring the ribs into contact and even pressing together, if desired.

Practice of the method obviates the use of expensive molding equipment and grooving machines and provides economy of effort with efficiency of operation.

Modifications may be made without departing from the scope of the invention as it is defined by the following claims:

I claim:

1. The method of making shoe soles having an incised tread face which comprises forming a tube of plastic material with grooves extending lengthwise thereof, coating the walls of the grooves with an adhesion-preventing substance, slitting the tube longitudinally, flattening the sheet so formed to close the grooves, and cutting shoe soles from the sheet extending cross wise of the grooves.

2. The method of making shoe soles having an incised tread face which comprises forming a tube of plastic material with grooves extending lengthwise thereof, coating the walls of the grooves with lacquer to form an adhesion preventing film thereover, slitting the tube longitudinally, flattening the sheet so formed to narrow the grooves, and cutting shoe soles from the sheet extending cross-wise of the grooves.

3. The method of making a tread having a multiplicity of flexible tread ribs of rubber-like material, which method comprises forming the rubber-like material in tubular form to provide a laterally convex wall with a multiplicity of longitudinally extending tread ribs on its outer face, separating the wall longitudinally to form a sheet, and flattening the sheet and thereby providing a tread face with the ribs thereof shifted toward one another to reduce the spacing between the ribs and present the ribs collectively as the tread face.

4. The method of making a tread having a multiplicity of flexible tread ribs of rubber-like material, which method comprises extruding the rubber-like material to provide a laterally convex sheet with a multiplicity of longitudinally extending tread ribs on its outer face, and flattening the sheet and thereby providing a tread face with the ribs thereof shifted toward one another to reduce the spacing between the ribs and present the ribs collectively as the tread face.

5. The method of making a shoe sole having a multiplicity of flexible tread ribs of rubber-like material, which method comprises forming the rubber-like material in tubular form to provide a laterally convex wall with a multiplicity of longitudinally extending tread ribs on its outer face, separating the wall longitudinally to form a sheet, coating the walls of the ribs with an adhesion-resisting substance, flattening the sheet and thereby shifting the ribs into contacting relation with one another, and cutting the sheet to provide a shoe sole with ribs extending across the sole.

NELSON E. TOUSLEY.